June 14, 1927.

G. B. COLEMAN 1,632,695

AUTOMATIC TRANSMISSION

Filed Feb. 21, 1925

Inventor

GEORGE B. COLEMAN

By

Attorney

June 14, 1927.

G. B. COLEMAN 1,632,695

AUTOMATIC TRANSMISSION

Filed Feb. 21, 1925

Inventor
George B. Coleman
By
Attorney

Patented June 14, 1927.

1,632,695

UNITED STATES PATENT OFFICE.

GEORGE B. COLEMAN, OF DAYTON, OHIO, ASSIGNOR TO COLEMAN AUTOMATIC TRANSMISSION COMPANY, OF SAN FRANCISCO, CALIFORNIA, A CORPORATION OF CALIFORNIA.

AUTOMATIC TRANSMISSION.

Application filed February 21, 1925. Serial No. 10,821.

The object of the invention is to provide a transmission mechanism in which the speed ratio between the driving and driven members will be automatically changed or varied to suit load conditions to allow for a maximum torque applied to the driven member when the load is greatest without involving any change in the power factors of the driving member; and to provide a construction in which the speed ratio of driving and driven members will be a minimum at the time of starting the driven member, with the gradual acceleration of the latter in infinitesimal increments until it attains the speed of the former.

With this object in view, the invention consists in a construction and combination of parts in which a preferred embodiment is illustrated in the accompanying drawings, wherein.

Figure 1:
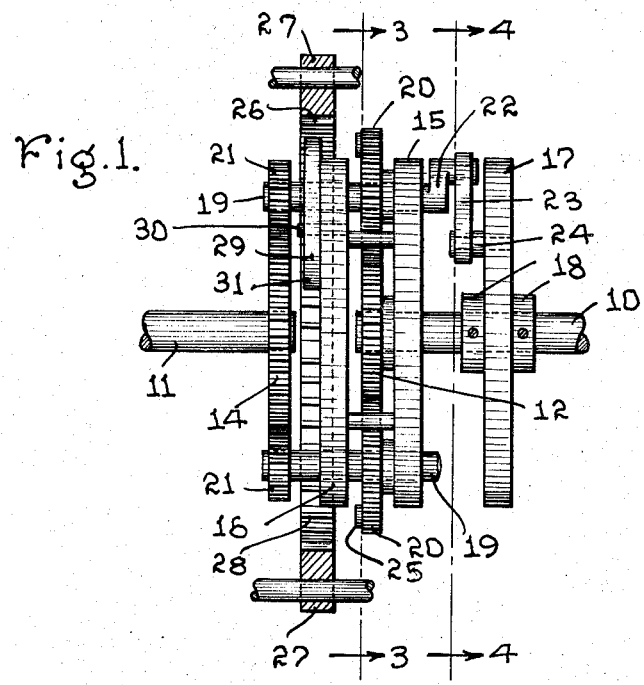
Figure 1 is a side elevational view of the construction embodying the invention.
Figure 3:
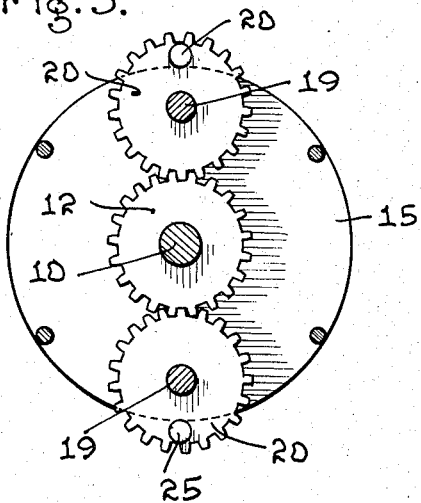
Figure 3 is a sectional view on the plane indicated by the line 3—3 of Figure 1.
Figure 4:
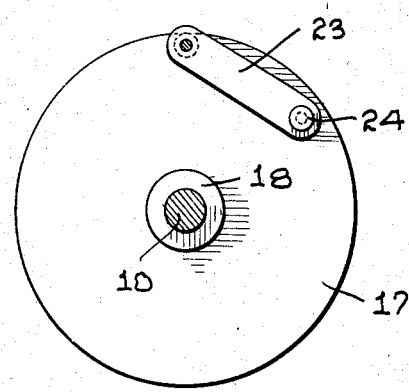
Figure 4 is a sectional view on the plane indicated by the line 4—4 of Figure 1.
Figure 2:
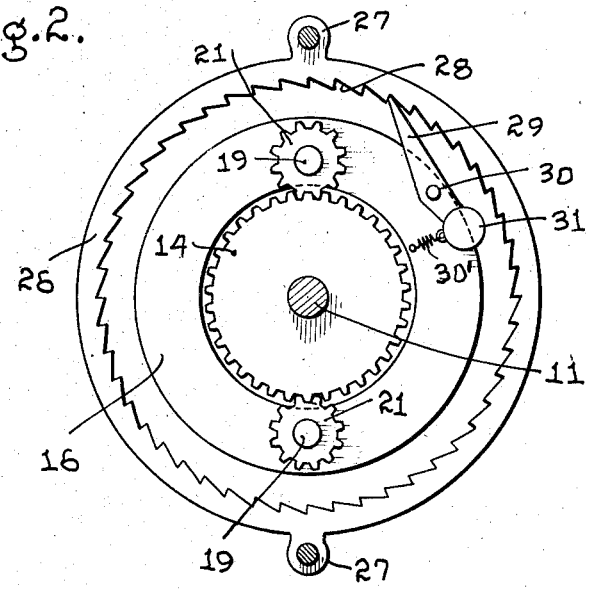
Figure 2 is a front elevational view.

Having the desirable features of the automatic transmission shown and described in application Serial No. 6394, filed February 2, 1925, but designed to have a greater speed range and therefore to provide a greater initial starting torque than the construction illustrated in said application, the present invention comprises the driving and driven shafts 10 and 11 which are axially aligned. Adjacent the extremity of the former there is carried the spur gear 12 and at the adjacent end of the latter the spur gear 14.

A carrier consisting of the plate 15 and ring 16 is carried by the driving shaft, the plate and ring being disposed in spaced relation, with the ring occupying a position between the spur gears 12 and 14 and the plate, which floats on the driving shaft, occupying a position between the spur gear 12 and a fly wheel 17 which also floats on the driving shaft but is precluded from axial movement thereon by the spaced collars 18 secured to the shaft.

The carrier rotatably supports the diametrically opposite short shafts 19 in axially parallel relation to the driving and driven shafts, the shafts 19 carrying the spur gears 20 meshing with the gear 12 and also carrying the pinions 21 meshing with the gear 14. One of the shafts 19 terminates in a crank 22 which is operatively connected with the fly wheel 17 by a link 23 connected with a wrist pin 24 on the fly wheel, this pin being adjacent the periphery of the fly wheel.

Obviously, upon rotation of the driving shaft, rotary movement will be imparted to the gear 12 with the result that the gears 20 will be rotated and these gears being fixed to the shafts 19, rotary movement will also be imparted to the pinions 21 which also are fixed to the shafts. Thus the gear 14 is rotated with the consequent rotation of the driven shaft, the speed and torque of the latter varying inversely as the speed and torque of the driving shaft. But the rotation of the gears 20 will result in the oscillation of the fly wheel 17 due to the crank and pin connection 22 and 23. The rate of oscillation of the fly wheel will be greatest when the carrier is stationary and motion to the driven shaft is transmitted from the driving shaft through the gear trains 12, 20, 21 and 14 and at this time the tendency to resist the rotation of the gears 20 and pinions 21 on their axes will be greatest, with the result that there will be a tendency of the carrier to move in the direction of rotation of the driving shaft. With the gradual acceleration of the carrier up to the speed of the driving shaft, there is a gradual falling off or diminution in the rate of oscillation of the fly wheel until finally the latter comes to rest relative to the driving shaft, at which time the gears 20 and 21 cease to rotate on their own axes and the driven shaft rotates at the speed of the driving shaft.

Upon any increase of load upon the driven shaft, however, as by the ascension of a hill where the construction would be used in a motor-driven vehicle, the reduction of speed to give the increased torque necessary results in angular movements of the gears 21 on their own axes and the oscillation of the fly wheel, the angular speed of the gears 20 and 21 on their own axes and the rate of oscillation of the fly wheel varying inversely with the reduction of the speed of the driven member below that of the driving member. As the load on the driven member is reduced, the angular speed of the gears 20 and 21 on their own axes is reduced with the consequent reduction in the rate of oscillation of the fly wheel until a balance again obtains, when the driving and driven members move in synchronism.

The gears 20 are preferably weighted, as indicated at 25, so that centrifugal force will tend to maintain them with the weights outwardly, in which position the crank 22 is disposed in a radial position outwardly from the driving shaft.

The inertia of the oscillating fly wheel tending to oppose rotation of the planetary gears 20 and 21 on their own axes results in a tendency to impart rotary movement to the carrier in the direction of rotation of the drive shaft. But at the same time, the load on the driven shaft tends to oppose this movement of the carrier, resulting in a reaction or a tendency of the carrier to rotate backwardly. Therefore, means must be provided to meet such reaction and such means comprises an annular rack 26 secured, as by means of ears 27, to some fixed part of the machine or appliance in connection with which the invention is used. The internal teeth 28 of the rack are of ratchet form and are engaged by the nose of a ratchet pawl 29 pivoted, as at 30, upon the ring 16 and yieldingly held in engagement with the teeth by means of a spring 30'. The nose of the pawl may slide over the teeth in the forward movement of the carrier but in reverse or retrograde movement, it impinges upon an adjacent tooth and thus precludes such retrograde movement due to the reaction above referred to. As the carrier accelerates to finally acquire the speed of the driving shaft, it is desirable that the pawl be disengaged from the rack, and this is accomplished by such means as a weight 31 carried by the pawl at the end remote from the nose. This weight, swinging outwardly upon the acceleration of the carrier, swings the nose of the pawl inwardly, thus disengaging it from the rack teeth until the speed of the carrier is reduced to the point where the centrifugal force of the weight is below the pull of the spring 30'.

Figure 5:
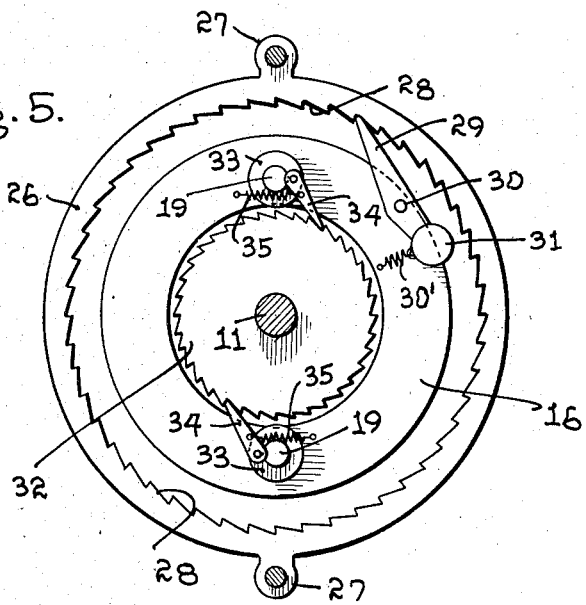
Figure 5 is a front elevational view of a modification.

In the modification shown in Figure 5, the spur gear 14 is replaced with a ratchet wheel 32 and in place of the pinions 21, disks 33 are provided and carried by the shafts 19. Mounted adjacent the peripheries of the disks are pawls 34, the noses of which engage the teeth of the ratchet wheel. As the disks 33 rotate, the pawls 34 are moved toward and away from the ratchet wheel, being mounted eccentrically of the disks. Consequently, the noses of the pawls slide over the teeth of the disks during a portion of the revolution of the disks and during the remainder of the revolution, engage an adjacent tooth and thus impart rotation to the wheel and therefore to the driven member. The pawls are yieldingly held in engagement with the teeth of the ratchet wheel by springs 35 and the two disks are so timed that the period of forward movement of the one pawl to impart rotation to the ratchet wheel occurs during the period of recession of the pawl carried by the other disk. Except for the replacement of pinion 21 and gear 14 with the ratchet wheel and disks, the modified construction is like the preferred construction above described.

The invention having been described, what is claimed as new and useful is:

1. A transmission comprising driving and driven members, a speed reducing epicyclic gear train operatively connecting the two, a rotary carrier supporting the planetary elements of said speed reducing gearing, an oscillatory member operatively connected with and actuated by a planetary element of the gearing, and an automatic control having a stationary element and a speed actuated element carried by the carrier and cooperating with the stationary element for preventing retrograde movement of the carrier.

2. A transmission comprising driving and driven members, a floating carrier carried by one of said members, an epicyclic gear train operatively connecting the members and having its planetary elements supported by the carrier, a floating fly wheel carried by one of the members and having a crank and link connection with one of the planetary elements of the gear train, and an automatic control for said carrier to prevent retrograde movement of the same.

3. A transmission comprising driving and driven members, a floating carrier carried by one of said members, an oscillatory element carried by one of said members, a gear couple having one of its elements carried by the driving member and the other by the carrier, a second gear couple having one of its elements carried by the driven member and the other by the carrier, the carrier carried elements being operatively connected and having operative connection with the oscillatory element, and automatic means to preclude movement of the carrier in a direction reverse to that of the driving member.

4. A transmission comprising driving and driven members, a carrier carried by one of said members, an oscillatory element carried by one of said members, a gear train operatively connecting said members and having certain of its elements carried by the carrier and operatively connected with the oscillatory element, a stationary annular rack member, and a pawl carried by the carrier and yieldingly impelled toward the teeth of the rack member and centrifugally operated for disengagement with said teeth upon rotation of the carrier, the pawl and rack precluding the rotation of the carrier in one direction.

In testimony whereof he affixes his signature.

GEORGE B. COLEMAN.